US010689233B2

(12) United States Patent
Roots

(10) Patent No.: US 10,689,233 B2
(45) Date of Patent: Jun. 23, 2020

(54) CABLE SPOOL LIFTING AND INVERSION BAR AND METHODS OF UTILISATION THEREOF

(71) Applicant: LIBIP HOLDINGS PTY LTD, Humpty Doo (AU)

(72) Inventor: Lloyd Roots, Humpty Doo (AU)

(73) Assignee: LIBIP HOLDINGS PTY LTD, Humpty Doo (AU)

( * ) Notice: Subject to any disclaimer, the term of this patent is extended or adjusted under 35 U.S.C. 154(b) by 0 days.

(21) Appl. No.: 16/466,129

(22) PCT Filed: Dec. 19, 2017

(86) PCT No.: PCT/AU2017/051416
§ 371 (c)(1),
(2) Date: Jun. 3, 2019

(87) PCT Pub. No.: WO2018/112523
PCT Pub. Date: Jun. 28, 2018

(65) Prior Publication Data
US 2020/0062552 A1    Feb. 27, 2020

(30) Foreign Application Priority Data
Dec. 21, 2016  (AU) ................................ 2016905286

(51) Int. Cl.
*B66C 1/24* (2006.01)
*B65G 7/08* (2006.01)

(52) U.S. Cl.
CPC . *B66C 1/24* (2013.01); *B65G 7/08* (2013.01)

(58) Field of Classification Search
CPC .................................... B66C 1/24; B65G 7/08
(Continued)

(56) References Cited

U.S. PATENT DOCUMENTS 1,501,888 A    7/1924  Coleman
1,605,273 A  * 11/1926  Norton ..................... B66C 1/54
                                                          294/93
(Continued)

FOREIGN PATENT DOCUMENTS

GB         2508156 A      5/2014

OTHER PUBLICATIONS

International Search Report dated Mar. 15, 2018 from PCT Application No. PCT/AU2017/051416.

*Primary Examiner* — Paul T Chin
(74) *Attorney, Agent, or Firm* — Innovation Capital Law Group, LLP; Vic Lin

(57) ABSTRACT

There is provided herein a lifting and inversion bar especially configured for repositioning cable spools which typically comprise fragile end stop annuli. The present cable spool lifting and inversion bar is configured for repositioning a cable spool comprising a length and radius between horizontal (that is wherein the axis of the cable spool is horizontal) and vertical (that is wherein the axis of the cable spools vertical) orientations. The inversion bar comprises a straight frame and an orthogonal shaft bisecting the frame into long and short ends. Furthermore, for the vertical orientation, the spool is able to freely rests atop the frame without additional support which negates the requirement for horizontal spacers as does the prior art. In this way, the spool may be conveniently lifted from the inversion by using a forklift, a convenient procedure not made possible by the prior art arrangements.

17 Claims, 10 Drawing Sheets

(58) Field of Classification Search
USPC ............ 294/67.2, 67.4, 67.5, 67.32; 414/780
See application file for complete search history.

(56) References Cited

U.S. PATENT DOCUMENTS

| | | | | |
|---|---|---|---|---|
| 2,374,120 | A | * | 4/1945 | Mueller .................... B66C 1/24 |
| | | | | 294/103.1 |
| 2,752,191 | A | | 6/1956 | Pierce |
| 2,816,792 | A | | 12/1957 | Dixon |
| 3,033,388 | A | * | 5/1962 | Horscroft .................. B66C 1/10 |
| | | | | 294/74 |
| 3,144,088 | A | * | 8/1964 | Kaplan .................. G01G 19/16 |
| | | | | 177/147 |
| 3,165,344 | A | * | 1/1965 | Holder ...................... B66C 1/26 |
| | | | | 294/67.2 |
| 3,291,519 | A | * | 12/1966 | Burke ....................... B66C 1/24 |
| | | | | 294/67.2 |
| 3,655,068 | A | | 4/1972 | Ervin |
| 4,166,647 | A | * | 9/1979 | Schmidt .................... B66C 1/62 |
| | | | | 294/86.41 |
| 4,245,861 | A | * | 1/1981 | Harry ....................... B66C 1/54 |
| | | | | 294/67.2 |
| 4,433,830 | A | * | 2/1984 | Campbell ............. F01D 25/285 |
| | | | | 254/264 |
| 5,688,009 | A | * | 11/1997 | Pienta ..................... B21C 47/24 |
| | | | | 294/67.2 |
| 5,688,010 | A | * | 11/1997 | Moyer ..................... B66C 1/24 |
| | | | | 294/67.2 |
| 6,565,136 | B1 | * | 5/2003 | Parker ...................... B66C 1/16 |
| | | | | 294/67.2 |
| 7,222,902 | B2 | * | 5/2007 | Slezak ..................... B66C 1/24 |
| | | | | 294/67.22 |

* cited by examiner

CABLE SPOOL LIFTING AND INVERSION BAR AND METHODS OF UTILISATION THEREOF

FIELD OF THE INVENTION

This invention relates generally to lifting devices more particularly, this invention relates to a lifting and inversion bar and methods of utilisation thereof specifically suited for cable spools which typically comprise end annuli.

BACKGROUND OF THE INVENTION

FIG. 1 shows disclosure of U.S. Pat. No. 3,655,068 A (ERVIN) 11 Apr. 1972 [hereinafter referred to as D1]. D1 discloses a device 12 for picking up annular objects. As can be seen from FIG. 1A the annular object 49 is laid atop a horizontal spacer 51. The device comprises an L-shaped member 12 which has a short leg which is inserted under an inner edge of the annular object 11 (may possible by the horizontal spacer 51) and connected to a cable 14. The cable is fed through a pulley 15 and connected by way of a yoke 13 to a notch of a long leg of the L-shaped device 12. The object then lifted by a crane. As the object lifts, the cable 14 passes freely through the pulley such that the object assumes a vertical orientation as is substantially shown in FIG. 1B.

However, D1 is deficient in several respects. Specifically, D1 requires the utilisation of a horizontal spacer 51 so as to be able to engage the short leg of the L-shaped member 12 under an inner edge of the annular object 11 in use. Spacer pallets 51 are not always available on construction sites and, furthermore, spacer pallets require machinery for their positioning.

As such, without the horizontal spacer 51, the spool 11 of D1 cannot be placed on the ground without the L-shaped member 12 digging into the ground and the member 12 and the cable 114 becoming irretrievably trapped under the weight of the spool. D1 does not recognise such a deficiency.

Furthermore, lifting the annular object 11 requires pivoting the annular object 11 on a corner thereof. Such places undue stress on the corner 53 of the annular object 11 which may damage the annular object 11. Indeed, the use of D1 would crush the typically wooden end annuli of conventional cable spools. Such problem is further not recognised by D1 probably given that the one is directed to more robust annular objects as compared to cable spools.

Furthermore, D1 is deficient with respect to the lowering of the object 11 to the ground again. Specifically, the corner 53 of the annular object 11 needs to be positioned correctly on the spacer 51 whereafter the pulley 15 needs to be transitioned laterally and simultaneously downwardly to lower the annular object 11 to the horizontal position as the cable 14 slides over the pulley 15. Such is a complex control manoeuvre and, if incorrectly performed may inadvertently result in the spool 11 slamming against the spacer 51 damaging either the spool 11 or the spacer 51.

FIG. 2 shows disclosure of U.S. Pat. No. 2,816,792 A (DIXON) 17 Dec. 1957 [hereinafter referred to as D2]. D2 discloses a coil lifting device comprising an inner arm 14, a parallel outer arm 13 and a cross piece 15 therebetween.

The outer arm comprises a clamp mechanism to bear against an outer periphery of the spool and the distal end of the inner arm comprises an edge 17 to engage the inner edge of the spool.

The arms and the cross piece comprise a plurality of holes into which a clevis 11 for a crane hook may be secured.

When secured to a central hole of the outer arm as shown in FIG. 2A, the spool may be carried horizontally. Alternatively, when engaged in a hole 40 located at a proximal end of the inner arm 14, the spool may be carried vertically is shown in FIG. 2C.

To transition the spool from a horizontal to vertical configuration, the clevis 11 is engaged within hole 41 such that when lifted, the spool assumes the angled orientation substantially shown in FIG. 2B. Then, to transition the spool to the vertical position, the edge 10A of the spool is placed on the ground such that the spool topples in the direction indicated by the arrow to the horizontal position. Conversely, to transition a spool from a vertical to a horizontal orientation, the clevis is engaged within hole 42 such that when the corner of the spool 10 is placed on the ground, the spool naturally topples to the horizontal position is shown in FIG. 2D.

However, D2 is deficient in several respects. Specifically, the clamp mechanism may be suitable for resilient coils of sheet-metal, but not for cable such as fragile telecommunication cables.

Furthermore, the methodology of D2 similarly requires the contacting of the corner of the spool with the ground surface under substantial weight which may damage the spool, especially for the typically wooden end annuli of cable spools.

Furthermore, as is evident from FIG. 2C, D2 yet require the utilisation of a horizontal support 43 which, as alluded to above, may not be readily available on construction sites and requires machinery for the positioning itself thereof.

Furthermore, with D2, a single cable is attached at one time. As such, for example, having hoisted the spool from a horizontal orientation with intention to transition in the spool to the vertical orientation as is substantially shown in FIG. 2B, it is not possible to set the spool back down in the horizontal orientation without firstly placing the spool down vertically, disconnecting and reconnecting the clevis 11 in the differing holes 42.

FIG. 3A shows the disclosure of U.S. Pat. No. 2,752,191 A (PIERCE) 26 Jun. 1956 [hereinafter referred to as D3]. D3 discloses a lifting device comprising an inflationary gripping tube connected to a framework comprising a lifting bar 15 and an orthogonal gooseneck 14. The inflationary gripping tube is inflated in use to press against and fractionally engage the inner surface of the core of the spool for lifting.

However, D3 is silent on transitioning the spool from vertical to horizontal orientations and vice versa. Specifically, D1 discloses the placing of a hook of a hoist lift in either eye ring 17 or 18 and lifting the spool according to conventional hoist practice.

FIG. 3B shows the disclosure of U.S. Pat. No. 1,501,888 A (MERIWETHER) 15 Jul. 1924 [hereinafter referred to as D4]. D4 discloses apparatus for handling concrete pipes. D4 discloses a gripping band and extends slightly more than 180° around a pipe having end members 11 having pulleys 12 through which a chain is fed. As tension is applied to the chain 17, the chain 17 grips the pipe 10 peripherally.

When lifted, the pipe swings to the angled orientation shown in FIG. 3B which depends on the location of the band 13, height of the tube and the like. Again, the transitioning from vertical to horizontal orientations comprises placing substantial weight in a corner of the pipe and allowing the pipe to topple horizontally or vertically. As alluded to above, such can damage the object and furthermore comprises a complex control procedure and wherein the orientation of the tube is relatively uncontrolled.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a lifting and inversion bar especially configured for repositioning cable spools which typically comprise end stop annuli, typically being fragile and made from wood.

The particular configurations of the present inversion bar allows repositioning of the spool without pivoting the spool on a corner thereof as do the prior art arrangements disclosed above (a problem not recognised by the prior art in any event).

Specifically, the present cable spool lifting and inversion bar is configured for repositioning a cable spool comprising a length and radius between horizontal (that is wherein the axis of the cable spool is horizontal) and vertical (that is wherein the axis of the cable spools vertical) orientations.

The inversion bar comprises a straight frame and an orthogonal shaft bisecting the frame into long and short ends. The shaft and the long end comprise strain taking connections at respective distal ends thereof.

The shaft is longer than the length of the cable spool so as to be able to protrude through the cable spool when inserted therethrough in use. Furthermore, the long end is longer than the radius so as to extend beyond an edge of the spool in use when the shaft is inserted through the core of the spool. Furthermore, the short end may be shorter than the radius so as to not interfere with the ground when the spool is in the horizontal orientation.

Furthermore, for the vertical orientation, the spool is able to freely rests atop the frame without additional support which negates the requirement for horizontal spacers as does the prior art. In this way, the spool may be conveniently lifted from the inversion by using a forklift, a convenient procedure not made possible by the prior art arrangements.

Specifically, the frame defines an upper surface upon which the spool rests in the vertical orientation. Furthermore, the frame comprises a widthwise stance so as to stand the spool upright, otherwise unsupported, on a supporting surface (i.e. the spool won't topple from side to side when resting atop the frame).

The manner of utilisation of the inversion bar is exemplified in FIGS. 6-11 showing the repositioning of the spool from the horizontal to vertical orientations.

As shown in FIG. 6, the inversion bar is initially suspended by the long end of the frame such that the shaft is able to be inserted horizontally through the core of the spool so as to extend from the other end thereof.

As is shown in FIG. 7, once inserted, a further cable is attached to the connection at the distal end of the shaft such that the spool may be hoisted by both cables.

FIGS. 8-10 illustrates the shorting of the shaft cable with respect to the frame cable such that the spool rotates to the vertical orientation.

When in the vertical orientation, the spool may be lowered to the ground and the cables disconnected. As can be seen from FIG. 11, the spool rests atop the frame which is stabilised by the widthwise stance thereof.

Tines of a forklift may be inserted in-line with the frame so as to engage the undersurface of the spool extending laterally therefrom so as to be able to lift the spool above and from the shaft.

Transitioning the spool from the vertical to horizontal configurations may take the opposite procedure.

As can be appreciated, none of the prior art discloses the present configuration wherein the spool is able to freely stand atop and be supported by the frame alone. Specifically, none of the prior art disclose the claimed features of the frame comprising an upper surface upon which the spool rests and the frame having a widthwise stance to provide lateral stability for the spool thereatop let alone the other configurations.

As is clear from D1, the spool cannot rest atop the L-shaped member 12 in the vertical orientation. Furthermore, as alluded to above, the L-shaped member 12 does not protect the end annuli as does the present inversion bar. Specifically, according to the present arrangement, the length of the long end being greater than the radius of the spool so as to extend therefrom protects the lower annulus of the spool which is typically wooden and fragile.

Furthermore, the present configuration allows the gradual and controlled rotation of the spool between the vertical and horizontal rotations which D1 does not.

Furthermore, the present configurations cannot be said to be obvious in light of D1 given that the problems addressed by the present configuration (such as: protecting the lateral annuli; avoiding having to pivot the spool on the corner of thereof; being able to rest the spool atop the device in the vertical orientation without requiring horizontal supports and the like) were not recognised by D1 and therefore the present configuration could not necessarily be said to be one that the skilled person would have tried as opposed to any other for that matter.

The present configuration is further novel and inventive in light of D2 for similar reasons. Specifically, the configuration taught by D2 similarly does not allow the spool to rest atop the lifting device rather requiring horizontal supports 43 (D2 does not teach resting the spool atop the lifting device and, in any event, the lifting device is so narrow that if it were, it would topple over without the horizontal supports 43). Furthermore, D2 requires pivoting on the corners of the spool, which is not feasible for cable spools for the reasons given above (a further problem not recognised by D2). Furthermore, the configurations of D2 is more complex than the present configuration and furthermore requires a clamp mechanism which is ill suited for cable spools, especially fragile telecommunication cables.

The present configuration is further novel and inventive in light of D3 for reasons including that for the configuration provided by D3, the spool cannot rest atop the lifting frame. Indeed, D3 is not directed to repositioning of the spool between horizontal and vertical orientations rather disclosing the hoisting of the spool in the conventional manner. Furthermore, D3 in fact teaches away from the present configuration in that the hoisting eyelet 18 is an opposite position as compared to the present configuration.

Finally, the present configuration is further novel and inventive in light of D4 and that D1 does not disclose any of the claimed features of the present invention.

As such, with the foregoing in mind, in accordance with one aspect, there is provided a cable spool lifting and inversion bar for repositioning a cable spool comprising a length and annuli having an annular radius between horizontal and vertical orientations, the bar comprising: a straight frame; and an orthogonal shaft bisecting the frame into long and short ends, the shaft and the long end comprising a strain taking connections at a respective distal ends thereof and the wherein: the shaft is longer than the length so as to be able to protrude through a core of the cable spool in use such that the shaft strain taking connection extends therebeyond; the long end is longer than the radius so as to be able to extend beyond an annular edge of the spool in use; the short end has the same length of the radius of is shorter than the radius so as to not extend substantially beyond an the annular edge of the spool in use; and for the vertical orientation, the frame defines: an upper surface; and a widthwise stance such that, in use the spool is able to stand atop the frame upper surface and be freely laterally supported thereby.

The frame may define a planar undersurface.

The cable spool lifting and inversion bar may further comprise ground engaging lateral supportive feet extending from sides of the frame.

The supportive feet comprise right angled brackets.

The frame may comprise a rectangular cross-section.

The frame defines a planar upper surface.

The frame may comprise a cross-section of approximately 250 mm.

The frame may comprise a cross-section of approximately 300 mm.

The frame may comprise a length of approximately 1680 mm.

The frame may comprise a cross-section of approximately 2195 mm.

The shaft may comprise a circular cross-section.

The shaft strain taking connections may comprise a plate having an eyelet therein welded lengthwise across a distal end of the shaft.

The shaft extends through the frame so as to be engaged by both upper and lower portions thereof.

The shaft may comprise a length of approximately 1550 mm.

The shaft may comprise a length of approximately 1950 mm.

According to another aspect, there is provided a method for repositioning a cable spool from horizontal to vertical orientations using a device as claimed in claim one, the method comprising: hoisting the inversion bar from the frame strain taking connections from a frame cable; inserting a free end of the shaft through a core of the cable spool until the shaft strain taking connection extends therefrom at an opposite end thereof; connecting a further shaft cable to the shaft strain taking connections; hoisting the cable spool using both the cables; shortening the shaft cable with respect to the frame cable such that the spool transitions from a horizontal to vertical configuration; lowering the cable spool and inversion bar to the ground; disconnecting the cables such that the cable spool rests atop the frame and is supported upright thereby.

The method may further comprise inserting forklift tines under a lower annulus of the cable spool in line with the frame; and lifting the cable spool from the shaft.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1A:
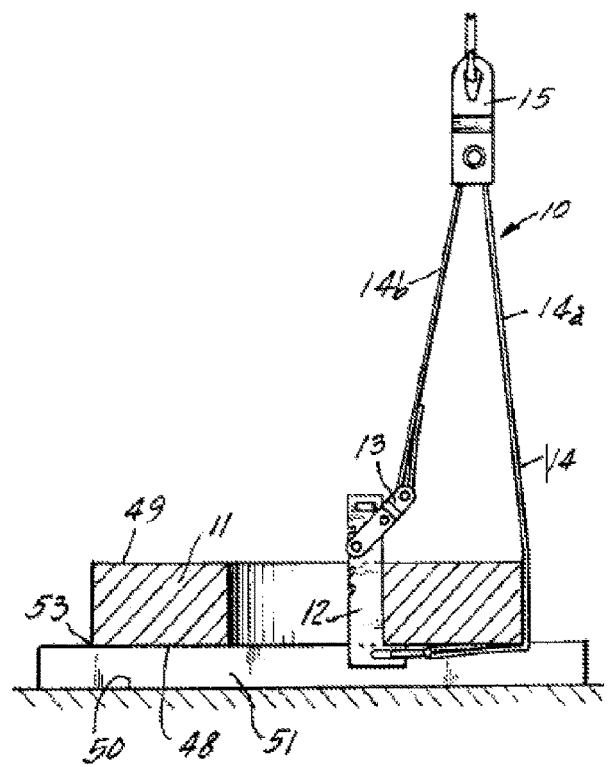
FIGS. 1-3 show various lifting devices of the prior art.
Figure 1B:
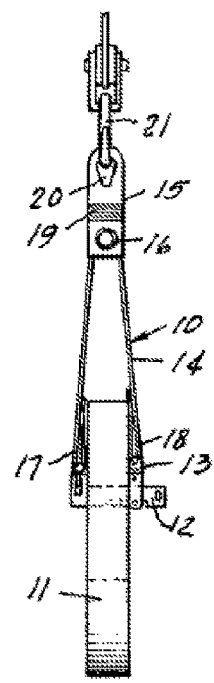
Figure 2A:
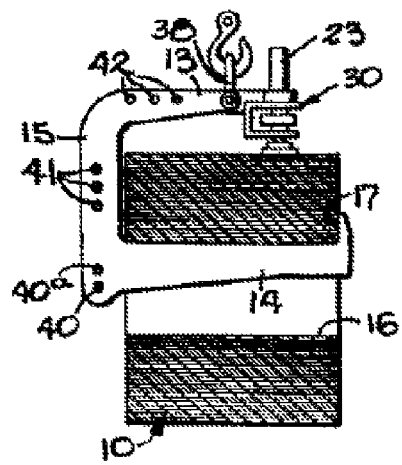
Figure 2B:
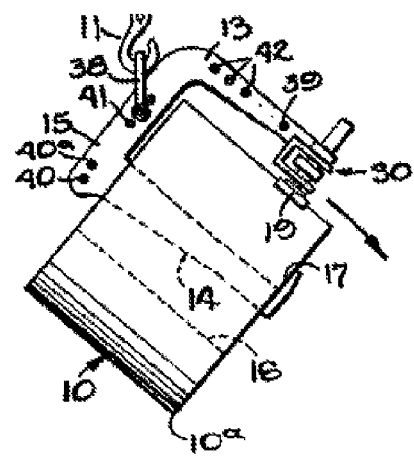
Figure 2C:
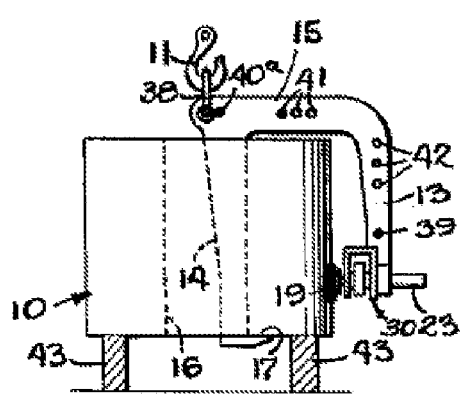
Figure 2D:
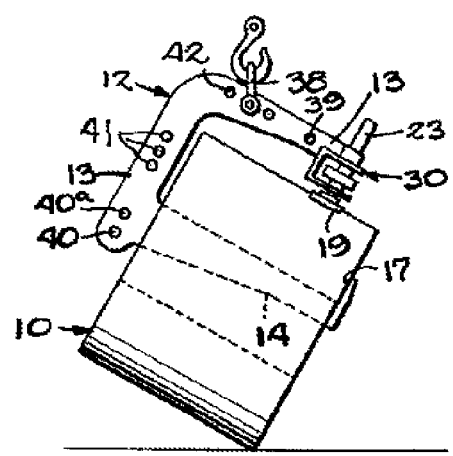
Figure 3A:
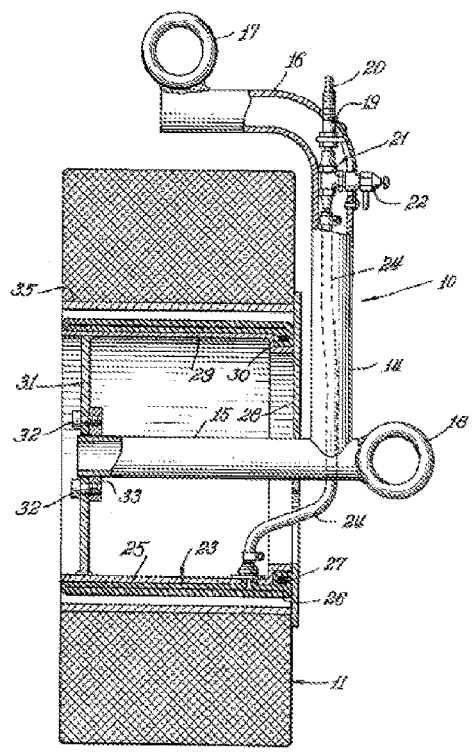
Figure 3B:
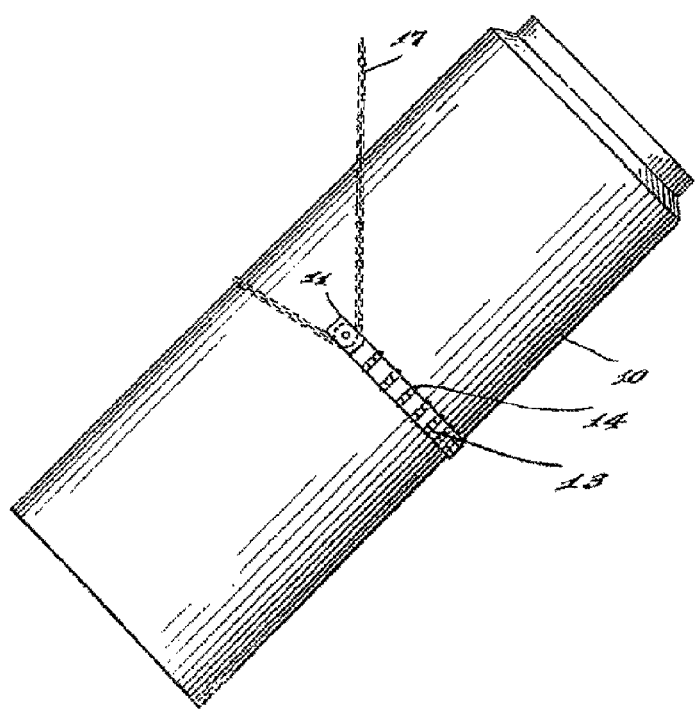

FIG. 4 shows a top isometric view of a lifting and inversion bar 100 especially suited for repositioning cable spools between horizontal and vertical orientations.

Cable spools generally comprise a cylindrical section adjoined lateral ends thereof by respective annuli. Cable is wound around the cylindrical section between the end annuli, typically to a radius less than that of the adjacent annuli. As will be appreciated from the ensuing description, the present lifting bar 100 is configured for repositioning cable spools between horizontal and vertical orientations in an advantageous matter compared to the prior art, including in protecting the end annuli, avoiding having to pivot the spool on a corner thereof, being able to freely rest the spool on the inversion bar 100 when in the vertical orientation so as to allow access thereto utilising a forklift and the like.

For reference, there will be described the inversion bar 100 for repositioning a cable spool comprising a length and a radius.

As shown in FIG. 4, the inversion bar 100 comprises a straight frame 102 which, in a preferred embodiment, comprises a rectangular cross-section.

An orthogonal shaft 101 is connected thereto so as to bisect the frame 102 into a long end 107 and a short end 108.

Figure 5:
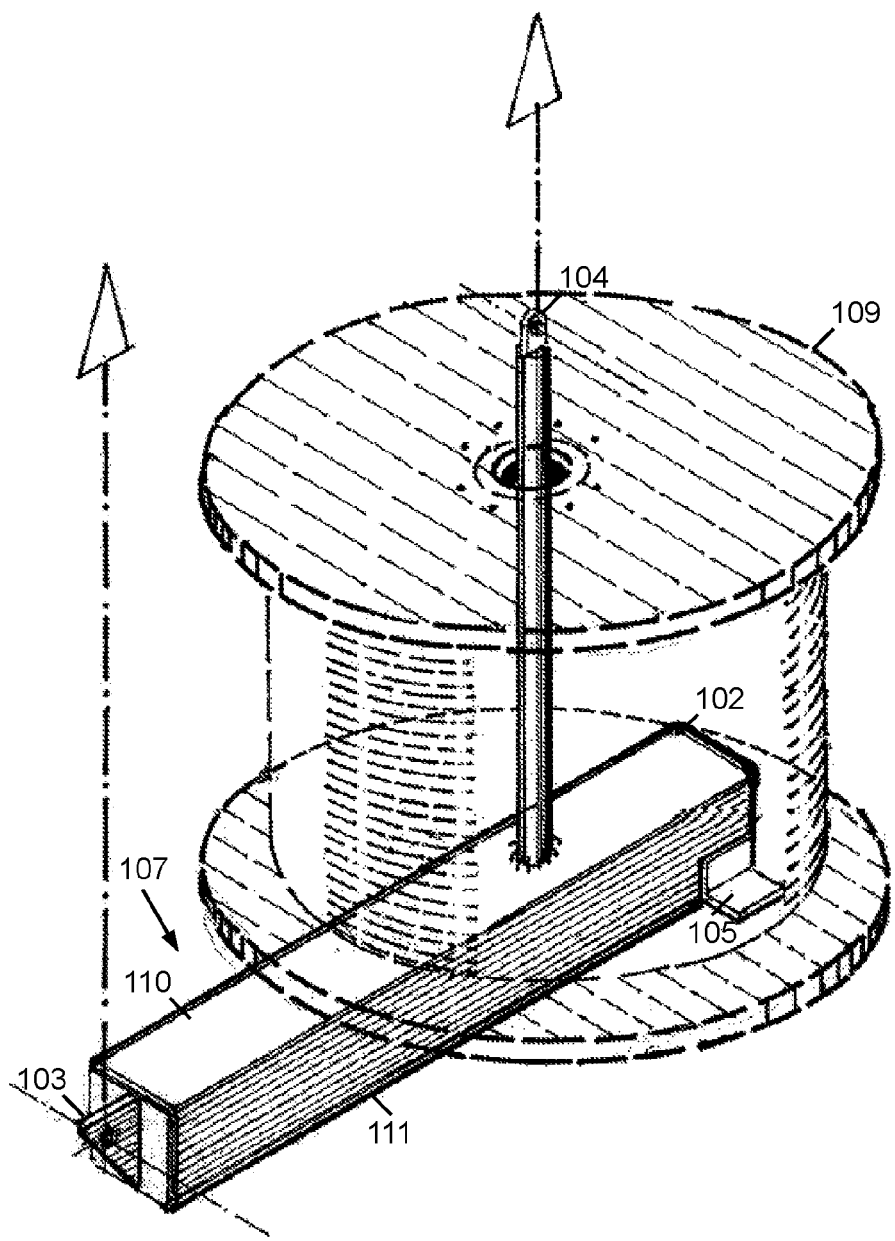
FIG. 5 illustrates the engagement of a cable spool by the inversion bar.

FIG. 5 shows an embodiment of the device 100 engaging a spool 109 in a vertical orientation. As can be seen, the long end 107 comprises a length greater than the radius of the spool so as to extend out from underneath an edge of the lower annulus thereof. In this way, the one in 107 may engage a hoisting cable when the spool 109 is in the vertical configuration. Furthermore, the short end is less than that of the radius so as to not interfere with the ground when the spool 109 is in the horizontal configuration.

Furthermore, the orthogonal shaft 101 is longer than the length of the spool 109 so as to be able to protrude from the opposite end of the cable spool 109 in the manner shown in FIG. 5.

In a preferred embodiment, the shaft 101 comprises round bar so as to maximise the occupancy of the core of the spool which may be limited in embodiments.

A strain taking connection 103 is located at a distal end of the long end 107. Similarly, a strain taking connection 104 is located at a distal end of the shaft 101.

Figures 4A, 4B:
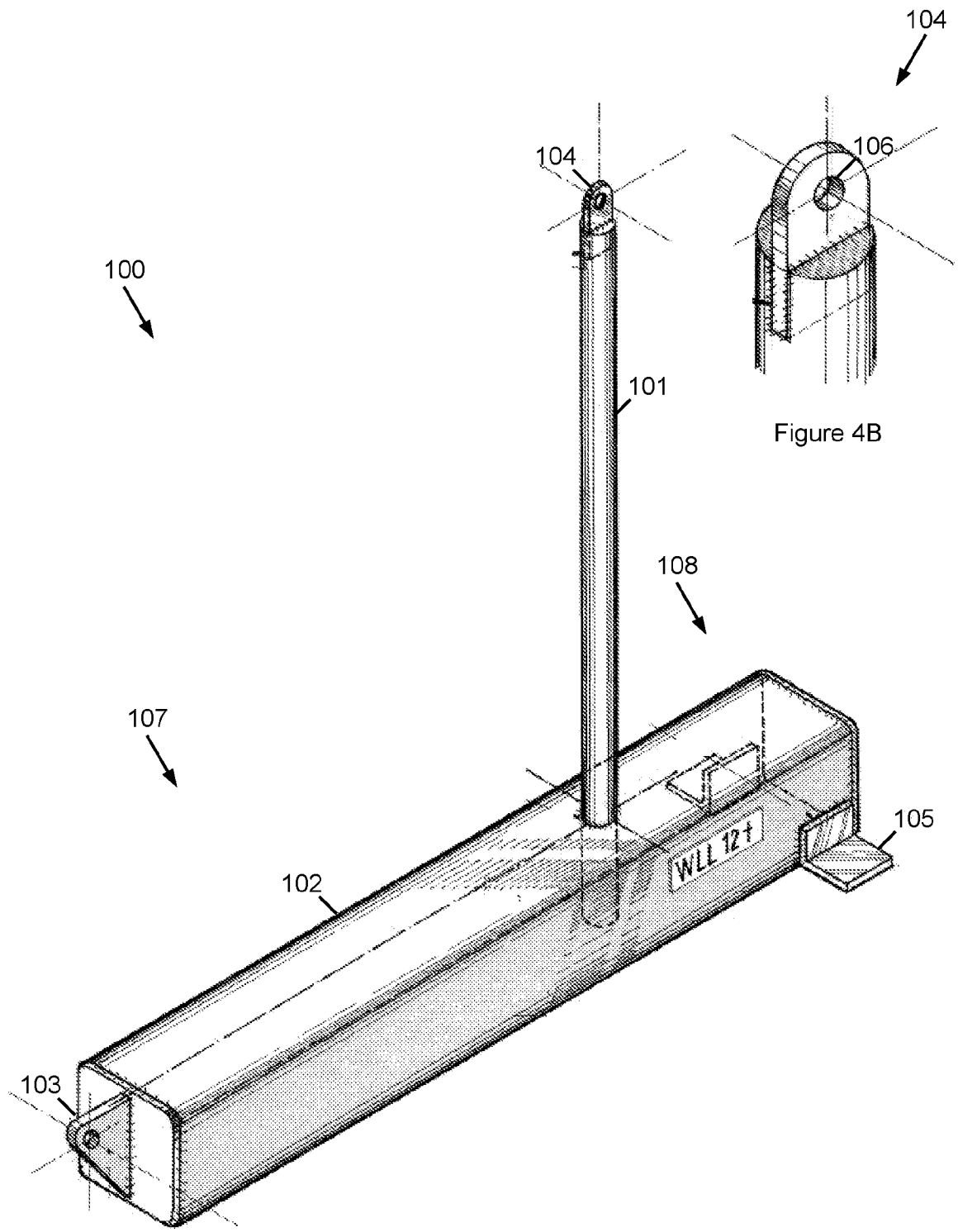
FIG. 4 shows an isometric view of a cable spool lifting and inversion bar in accordance with an embodiment.

As is shown a FIG. 4B, the connection 104 may take the form of a rounded plate comprising an eye 106 therein welded widthwise across the distal end of the shaft 101.

Similarly, the long end 107 connection 103 may take the form of a plate similarly defining an eye and welded to an end face of the long end 107. In the embodiment shown, the plate may be triangular so as to locate the eye towards the upper surface of the frame 102.

Now, as can be appreciated from the vertical orientation configuration provided in FIG. 5, the lower annulus of the spool 109 is able to rest atop an upper surface 110 of the frame 102. In a preferred embodiment wherein the frame 102 is rectangular, the upper surface 107 may be planar so as to evenly support the lower annulus thereacross avoiding damage thereto.

Furthermore, the framework 102 may comprise a widthwise stance so as to be able to freely support the spool 109 upright without topping over. In other words, the cables may be disconnected from the connections 103, 104 such that the spool 109 remains stable atop the frame 102. In this way, the spool 109 may be stored atop the inversion bar 100. Furthermore, by being freely supported by the frame 102, the spool 109 may be ready for picking up by a forklift as will be described in further detail below.

In the embodiment wherein the frame 102 is rectangular, the frame 102 may similarly comprise a lower planar surface comprising a width which extends sufficiently laterally so as to stabilise the spool 109 thereatop without topping over.

For enhanced lateral support, further lateral extending feet 105 may extend from edges of the frame 102.

The utilisation of the inversion bar 100 will now be described with reference to FIGS. 6-11 illustrating the repositioning of a spool 109 from horizontal to vertical orientations.

Figure 6:
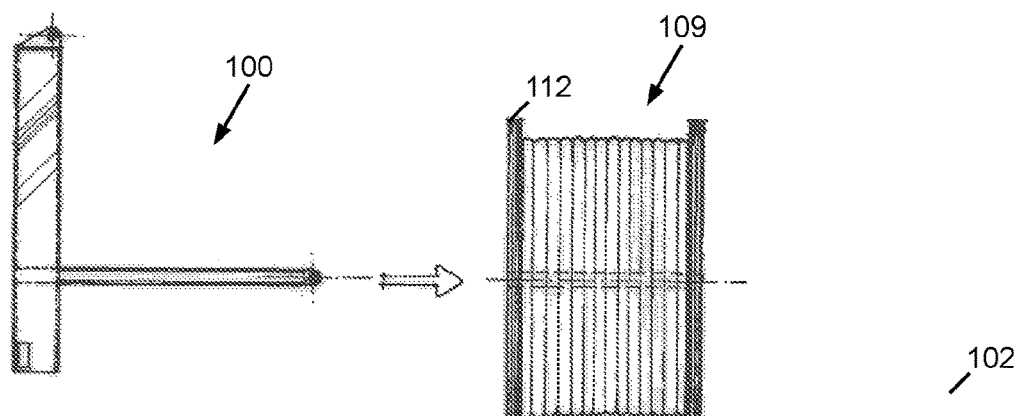
FIGS. 6-11 illustrate the repositioning of a cable spool from horizontal to vertical orientation utilising the present inversion bar.

FIG. 6 shows the spool 109 in the horizontal configuration which may be the configuration the spool 109 arrives atop a truck bed or the like.

Figure 7:
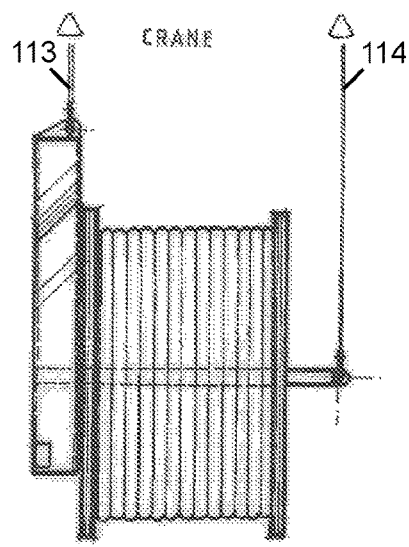

An adjacent crane, suspending the frame 102 at the long end 107 using a frame cable 113 lowers the inversion bar 100 adjacent and end annulus such that, as is shown in FIG. 7, the shaft 101 is able to be inserted longitudinally through the core of the cable spool 109 so as to protrude from an opposite end thereof exposing the connection 104 of the shaft 101.

Thereafter, a shaft cable 114 is attached to the shaft connector 104. As such, the cable spool 109 may be hoisted from these cable is 113, 114 simultaneously.

Figure 8:
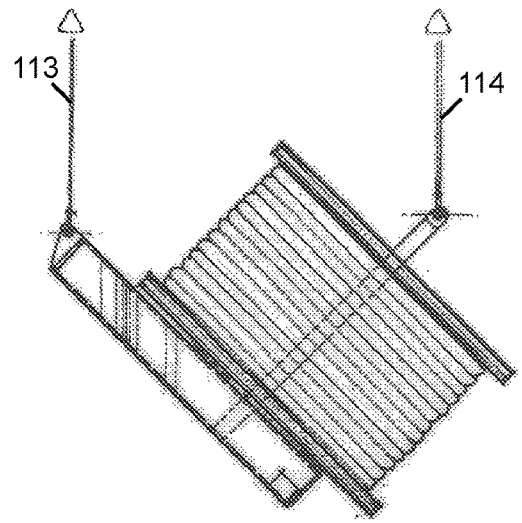
Figure 9:
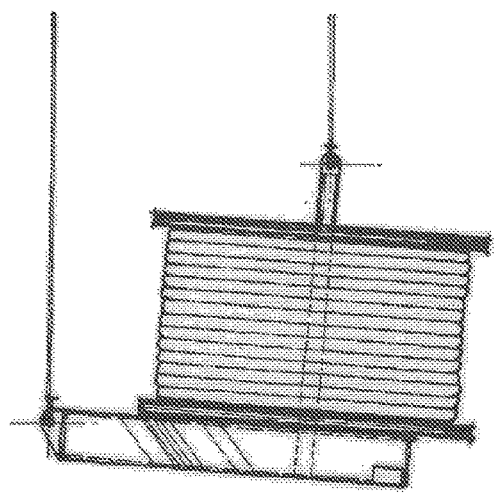
Figure 10:
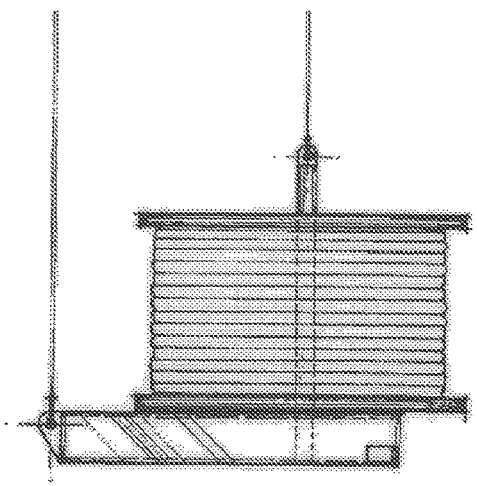
Figure 11:
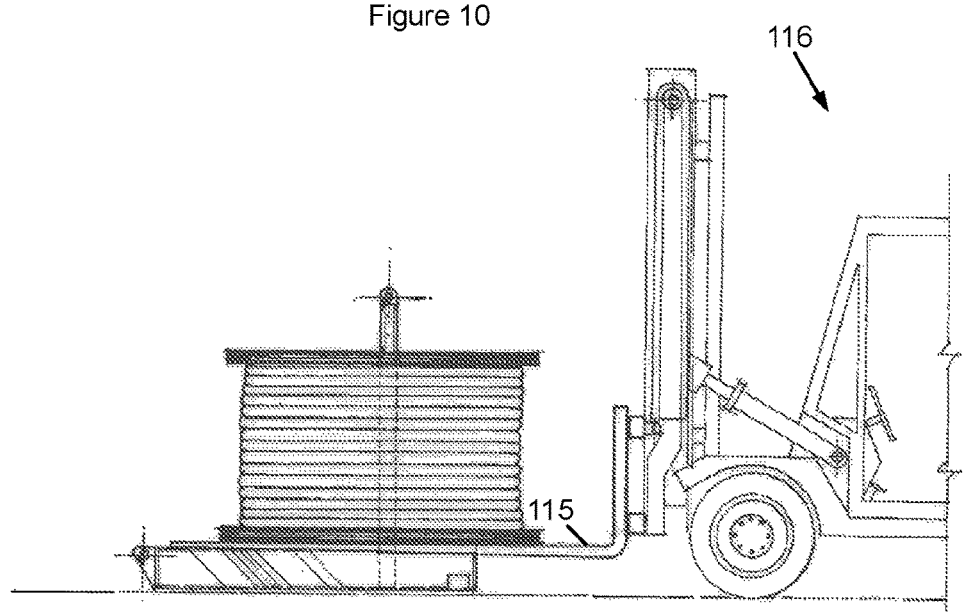

Once suspended and as is illustrated in FIG. 8, the shaft cable 114 may be shortened with respect to the frame cable 113 such that the spool 109 transitions from the horizontal to the vertical configurations as is illustrated in FIGS. 8-10 in a controlled manner (as compared to the uncontrolled mannerisms of the prior art). In one embodiment, each crane cable 113, 114 may be controlled independently, such as by separate cranes or differing cable mechanisms of a single crane. Alternatively, the cables may loop about a driven shaft which is controlled to rotate one way or the other to respectively lengthen or shorten the cables with respect to each other. At no time of the cables free running around a pulley as per the prior art in an uncontrolled manner.

Furthermore, as can be appreciated, the transitioning from the horizontal to vertical configurations does not require the spool 109 to be pivoted on a corner thereof on the ground which may damage the end annuli 112.

Once repositioned in the vertical orientation, the spool 109 may be lowered such that the frame 102 rest upon the ground.

Thereafter, the cables 113, 114 may be disconnected from the respective connections 103 104.

As can be appreciated, the widthwise stance of the frame 102, such as the planar undersurface thereof comprising sufficient width and, in embodiments, the additionally laterally supportive feet 105, may maintain the cable spool 109 in the upright configuration. In such a configuration, the spool 109 may be left indefinitely atop the inversion bar 100 without toppling over.

When required for repositioning or moving, tines 115 of a forklift 116 may be inserted under the lower annulus of the cable spool 109 and subsequently lifted so as to lift the cable spool 109 from the shaft 101.

As can be appreciated, the pair of tines 115 may slide under the lower annulus of the spool 109 adjacent the frame 102. In this regard, the laterally extending supportive feet 105 may be provided by way right angled brackets which do not unnecessarily interfere with the insertion of the tines thereunder.

Figure 12:
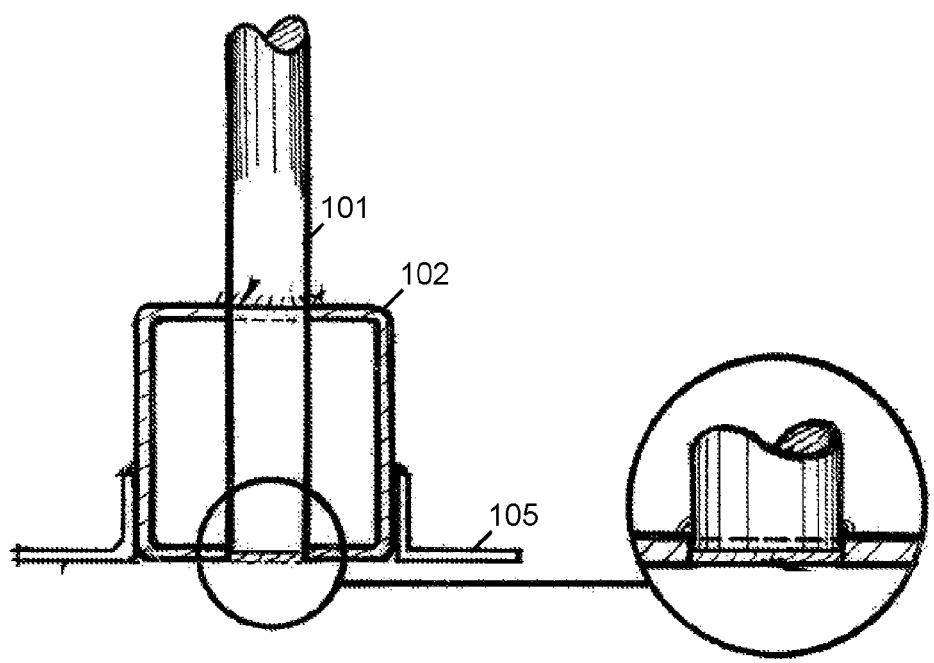
FIG. 12 shows an end-on cross-sectional elevation view illustrating the shaft extending through the frame of the inversion bar in accordance with an embodiment.
Figure 13:
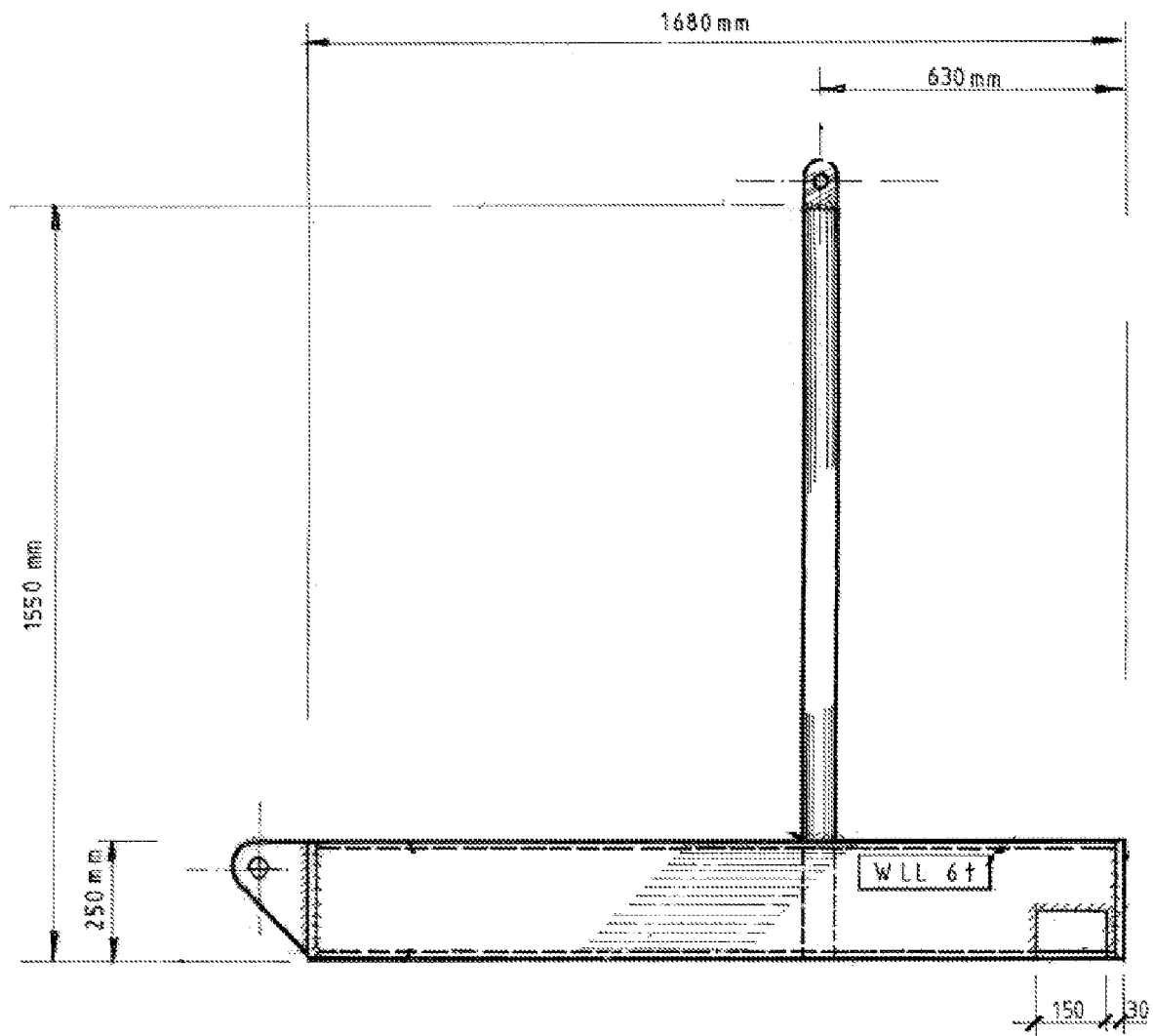
FIG. 13-14 shows exemplary dimensions of the lifting bar for a six-tonne weight load limit.
Figure 14:
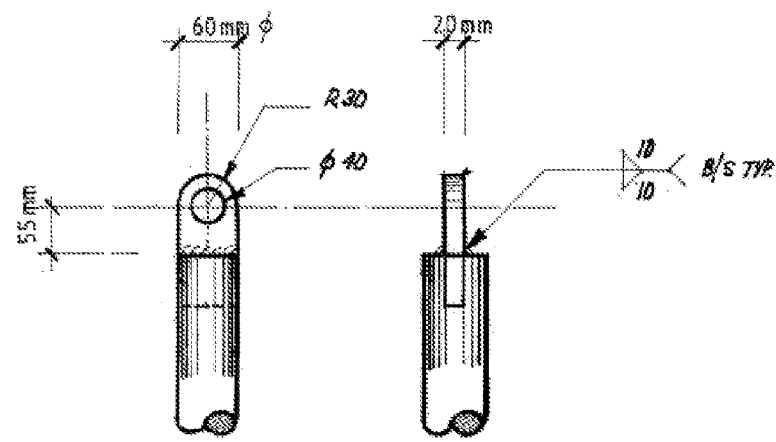

FIG. 12 shows an embodiment wherein the shaft 101 extends through the frame 102 so as to be engaged both at upper and lower portions thereof for enhanced structural robustness. In embodiments, the proximal end of the shaft 101 may be recessed halfway within the base portion of the frame 102 and welded therein.

FIGS. 1-14 show exemplary dimensions of the inversion bar 100 for a six-tonne weight load limit. As can be seen, in this embodiment, the frame 102 may comprise a length of approximately 1680 mm in the shaft may comprise a length of approximately 1550 mm. Furthermore, the frame 102 may comprise a cross-section of 250 mm$^2$. The shaft 102 may engage the frame 102 such that the short end 108 is approximately 630 mm. The lateral extending support feet 105 may comprise a width of approximately 150 mm and may be set off 30 mm from the end of the frame 102.

Figure 15:
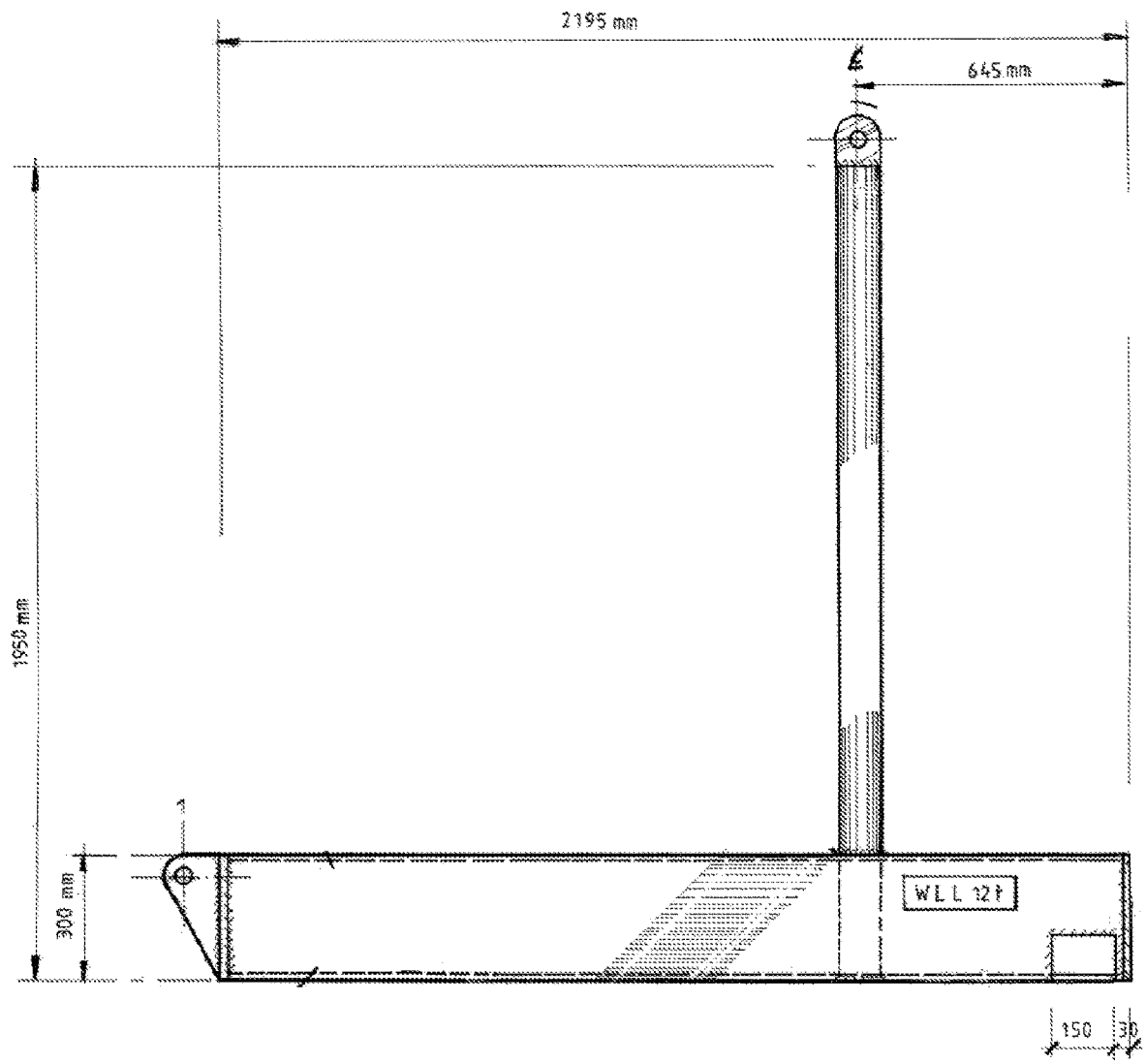
FIG. 15-16 shows exemplary dimensions of the lifting bar for a 12-tonne weight load limit.
Figure 16:
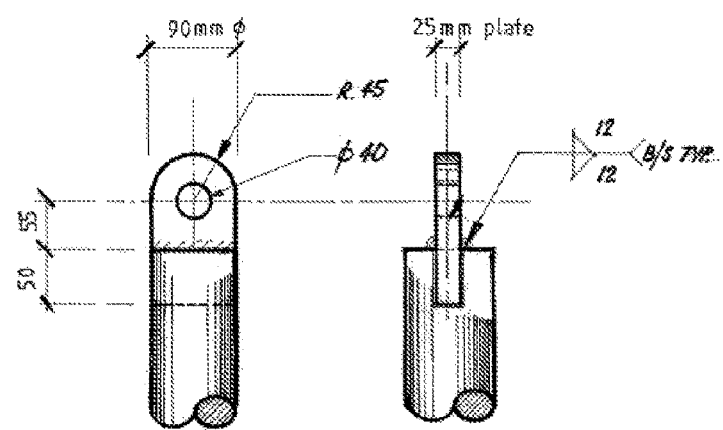

FIGS. 15-16 show a further embodiment wherein the inversion bar 100 is configured for a 12-tonne weight load limit. As can be appreciated, the inversion bar 100 in accordance with this embodiment is of greater dimension wherein the frame 102 may comprise a length of approximately 2195 mm and the shaft 101 may comprise a length of approximately 1950 mm. Furthermore, the short end is approximately 245 mm. Yet further, the frame 102 may be of approximately 300 mm$^2$.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A cable spool lifting and inversion bar for repositioning a cable spool comprising a length and annuli having an annular radius between horizontal and vertical orientations, the bar comprising:
   a straight frame; and
   an orthogonal shaft bisecting the frame into long and short ends, the shaft and the long end comprising a strain taking connections at respective distal ends thereof and wherein:

the shaft is longer than the length so as to be able to protrude through a core of the cable spool in use such that the shaft strain taking connection extends therebeyond;

the long end is longer than the radius so as to be able to extend beyond an annular edge of the spool in use;

the short end has the same length as the radius or is shorter than the radius so as to not extend substantially beyond the annular edge of the spool in use; and for the vertical orientation, the frame defines:
  an upper surface; and
  a widthwise stance such that, in use the spool is able to stand atop the frame upper surface and be freely laterally supported thereby.

2. A cable spool lifting and inversion bar as claimed in claim 1, wherein the frame defines a planar undersurface.

3. A cable spool lifting and inversion bar as claimed in claim 2, further comprising ground engaging lateral supportive feet extending from sides of the frame.

4. A cable spool lifting and inversion bar as claimed in claim 3, wherein the supportive feet comprise right angled brackets.

5. A cable spool lifting and inversion bar as claimed in claim 2, wherein the frame comprises a rectangular cross-section.

6. A cable spool lifting and inversion bar as claimed in claim 5, wherein the frame defines a planar upper surface.

7. A cable spool lifting and inversion bar as claimed in claim 5, wherein the frame comprises a cross-section of approximately 250 mm.

8. A cable spool lifting and inversion bar as claimed in claim 5, wherein the frame comprises a cross-section of approximately 300 mm.

9. A cable spool lifting and inversion bar as claimed in claim 1, wherein the frame comprises a length of approximately 1680 mm.

10. A cable spool lifting and inversion bar as claimed in claim 1, wherein the frame comprises a cross-section of approximately 2195 mm.

11. A cable spool lifting and inversion bar as claimed in claim 1, wherein the shaft comprises a circular cross-section.

12. A cable spool lifting and inversion bar as claimed in claim 11, wherein the shaft strain taking connections comprises a plate having an eyelet therein welded lengthwise across a distal end of the shaft.

13. A cable spool lifting and inversion bar as claimed in claim 1, wherein the shaft extends through the frame so as to be engaged by both upper and lower portions thereof.

14. A cable spool lifting and inversion bar as claimed in claim 1, wherein the shaft comprises a length of approximately 1550 mm.

15. A cable spool lifting and inversion bar as claimed in claim 1, wherein the shaft comprises a length of approximately 1950 mm.

16. A method for repositioning a cable spool from horizontal to vertical orientations using a device as claimed in claim 1, the method comprising:

hoisting the inversion bar from the frame strain taking connections from a frame cable;

inserting a free end of the shaft through a core of the cable spool until the shaft strain taking connection extends therefrom at an opposite end thereof;

connecting a further shaft cable to the shaft strain taking connections;

hoisting the cable spool using both the cables;

shortening the shaft cable with respect to the frame cable such that the spool transitions from a horizontal to vertical configuration;

lowering the cable spool and inversion bar to the ground;

disconnecting the cables such that the cable spool rests atop the frame and is supported upright thereby.

17. A method as claimed in claim 16, further comprising inserting forklift tines under a lower annulus of the cable spool in line with the frame; and lifting the cable spool from the shaft.

\* \* \* \* \*